United States Patent
Asnaashari et al.

(10) Patent No.: US 10,042,758 B2
(45) Date of Patent: Aug. 7, 2018

(54) HIGH AVAILABILITY STORAGE APPLIANCE

(71) Applicant: Avalanche Technology, Inc., Fremont, CA (US)

(72) Inventors: Mehdi Asnaashari, Danville, CA (US); Siamack Nemazie, Los Altos Hills, CA (US); Anilkumar Mandapuram, San Jose, CA (US)

(73) Assignee: Avalanche Technology, Inc., Fremont, CA (US)

( * ) Notice: Subject to any disclaimer, the term of this patent is extended or adjusted under 35 U.S.C. 154(b) by 76 days.

(21) Appl. No.: 14/688,996

(22) Filed: Apr. 16, 2015

(65) Prior Publication Data
US 2015/0220435 A1 Aug. 6, 2015

Related U.S. Application Data (63) Continuation of application No. 13/970,536, filed on Aug. 19, 2013, now Pat. No. 9,037,786, and a continuation-in-part of application No. 13/831,921, filed on Mar. 15, 2013, which is a continuation-in-part of application No. 13/769,710, filed on Feb. 18, 2013, now Pat. No. 8,909,855, which is a continuation-in-part of application No. 13/745,686, filed on Jan. 18, 2013, now Pat. No. 9,009,396, which is a continuation-in-part of application No. 13/673,866, filed on Nov. 9, 2012, (Continued)

(51) Int. Cl.
*G06F 12/00* (2006.01)
*G06F 12/06* (2006.01)
*G06F 12/02* (2006.01)
*G06F 11/20* (2006.01)
*G06F 11/14* (2006.01)

(52) U.S. Cl.
CPC .............. *G06F 12/06* (2013.01); *G06F 11/20* (2013.01); *G06F 11/201* (2013.01); *G06F 11/2005* (2013.01); *G06F 11/2092* (2013.01); *G06F 11/2094* (2013.01); *G06F 12/0246* (2013.01); *G06F 11/1441* (2013.01); *G06F 2212/1032* (2013.01); *G06F 2212/2022* (2013.01)

(58) Field of Classification Search
CPC ...... G06F 12/06; G06F 11/20; G06F 11/2005; G06F 12/201; G06F 11/2092; G06F 11/2094; G06F 12/0246; G06F 11/1441; G06F 2212/1032; G06F 2212/2022
USPC ........................................................ 711/103
See application file for complete search history.

(56) References Cited

U.S. PATENT DOCUMENTS

| | | | |
|---|---|---|---|
| 7,904,629 B2 * | 3/2011 | Daniel ................ | G06F 13/4022 710/306 |
| 2010/0281230 A1 * | 11/2010 | Rabii .................... | G06F 3/0605 711/165 |
| 2012/0215970 A1 * | 8/2012 | Shats .................. | G06F 12/0866 711/103 |

* cited by examiner

*Primary Examiner* — Matthew Bradley
(74) *Attorney, Agent, or Firm* — Maryam Imam; Bing K. Yen (57) ABSTRACT

A high-availability storage system includes a first storage system and a second storage system. The first storage system includes a first Central Processing Unit (CPU), a first physically-addressed solid state disk (SSD) and a first non-volatile memory module that is coupled to the first CPU. Similarly, the second storage system includes a second CPU and a second SSD. Upon failure of one of the first or second CPUs, or the storage system with the non-failing CPU continues to be operational and the storage system with the failed CPU is deemed inoperational and the first and second SSDs remain accessible.

17 Claims, 7 Drawing Sheets

Related U.S. Application Data which is a continuation-in-part of application No. 13/570,202, filed on Aug. 8, 2012.

(60) Provisional application No. 61/801,514, filed on Mar. 15, 2013, provisional application No. 61/538,697, filed on Sep. 23, 2011.

HIGH AVAILABILITY STORAGE APPLIANCE

CROSS REFERENCE TO RELATED APPLICATIONS

This application is a continuation of U.S. patent application Ser. No. 13/970,536, filed on Aug. 19, 2013, by Mehdi Asnaashari, and entitled "STORAGE SYSTEM EMPLOYING MRAM AND ARRAY OF SOLID STATE DISKS WITH INTEGRATED SWITCH", which claims priority to U.S. Provisional Patent Application No. 61/801,514, filed on Mar. 15, 2013, by Mehdi Asnaashari, and entitled "STORAGE SYSTEM EMPLOYING MRAM AND ARRAY OF SOLID STATE DISKS WITH INTEGRATED SWITCH" and it is a continuation-in-part of U.S. patent application Ser. No. 13/831,921, filed on Mar. 15, 2013, by Mehdi Asnaashari, and entitled "STORAGE SYSTEM EMPLOYING MRAM AND ARRAY OF SOLID STATE DISKS WITH INTEGRATED SWITCH", which is a continuation-in-part of U.S. patent application Ser. No., 13/769,710, filed on Feb. 19, 2013, by Siamack Nemazie, which is a continuation-in-part of U.S. patent application Ser. No. 13/745,686, filed on Jan. 18, 2013, by Siamack Nemazie and entitled "Physically Addressed Solid State Disk Employing MRAM", which is a continuation-in-part of U.S. patent application Ser. No. 13/673,866, filed on Nov. 9, 2012, by Siamack Nemazie and entitled "SYSTEM EMPLOYING MARAM AND PHYSICALLY ADDRESSED SOLID STATE DISK", which is a continuation-in-part of U.S. patent application Ser. No. 13/570,202, filed on Aug. 8, 2012, by Siamack Nemazie and Ngon Van Le, and entitled "SOLID STATE DISK EMPLOYING FLASH AND MAGNETIC RANDOM ACCESS MEMORY (MRAM)", which claims priority U.S. Provisional Application No. 61/538, 697, filed on Sep. 23, 2011, entitled "Solid State Disk Employing Flash and MRAM", by Siamack Nemazie, all of which are incorporated herein by reference as though set forth in full.

FIELD OF THE INVENTION

This invention relates generally to storage systems, and particularly to high-availability storage systems with increased reliability.

BACKGROUND

Solid State Drives (SSDs) using flash memories have become a viable alternative to Hard Disc Drives (HDDs) in many applications. Such applications include storage for notebook, tablets, servers and network-attached storage appliances. In notebook and tablet applications, storage capacity is not too high, and power and or weight and form factor are key metric. In server applications, power and performance (sustained read/write, random read/write) are key metrics. In network-attached storage appliances, capacity, power, and performance are key metrics with large capacity being achieved by employing a number of SSDs in the appliance. SSD may be directly attached to the system via a bus such as SATA, SAS or PCIe.

Flash memory is a block-based non-volatile memory with each block organized into and made of various pages. After a block is programmed into the flash memory, it must be erased prior to being programmed again. Most flash memory require sequential programming of pages within a block. Another limitation of flash memory is that blocks can only be erased for a limited number of times, thus, frequent erase operations reduce the life time of the flash memory. A flash memory does not allow in-place updates. That is, it cannot overwrite existing data with new data. The new data are written to erased areas (out-of-place updates), and the old data are invalidated for reclamation in the future. This out-of-place update causes the coexistence of invalid (i.e. outdated) and valid data in the same block.

Garbage Collection (GC) is the process to reclaim the space occupied by the invalid data, by moving valid data to a new block and erasing the old block. But garbage collection results in significant performance overhead as well as unpredictable operational latency. As mentioned, flash memory blocks can be erased for a limited number of times. Wear leveling is the process to improve flash memory lifetime by evenly distributing erases over the entire flash memory (within a band).

The management of blocks within flash-based memory systems, including SSDs, is referred to as flash block management and includes: Logical to Physical Mapping; Defect management for managing defective blocks (blocks that were identified to be defective at manufacturing and grown defective blocks thereafter); Wear leveling to keep program/erase cycle of blocks within a band; Keeping track of free available blocks; and Garbage collection for collecting valid pages from a number of blocks (with a mix of valid and invalid page) into one block and in the process creating free blocks are examples of block management required to effectuate writing and programming of flash memory. Flash block management requires maintaining various tables referred to as flash block management tables (or "flash tables"). These tables are generally proportional to the capacity of SSD.

Generally, the flash block management tables can be constructed from metadata maintained on flash pages. Metadata is non-user information written on a page. Such reconstruction is time consuming and generally performed very infrequently upon recovery during power-up from a failure (such as power fail). In one prior art technique, the flash block management tables are maintained in a volatile memory, and as mentioned, the flash block management tables are constructed from metadata maintained in flash pages during power-up. In another prior art technique, the flash block management tables are maintained in a battery-backed volatile memory, utilized to maintain the contents of volatile memory for an extended period of time until power is back and tables can be saved in flash memory. In yet another prior art technique, the flash block management tables are maintained in a volatile random access memory (RAM), the flash block management tables are periodically and/or based on some events (such as a Sleep Command) saved (copied) back to flash, and to avoid the time consuming reconstruction upon power-up from a power failure additionally a power back-up means provides enough power to save the flash block management tables in the flash in the event of a power failure. Such power back-up may comprise of a battery, a rechargeable battery, or a dynamically charged super capacitor.

Flash block management is generally performed in the solid state drive (SSD) and the tables reside in the SSD. Alternatively, the flash block management may be performed in the system by a software or hardware, commands additionally include commands for flash management commands and the commands use physical addresses rather than logical addresses. An SSD with commands using physical addresses is referred to as Physically-Addressed SSD. The flash block management tables are maintained in the (volatile) system memory.

A storage system (also referred to as "storage array", or "storage appliance") is a special purpose computer system attached to a network, dedicated to data storage and management. The storage system may be connected to Internet Protocol (IP) Network running Network File System (NFS) protocol or Common Internet File System (CIFS) protocol or Internet Small Computer System (iSCSI) protocol or to a Storage Area Network (SAN) such as Fiber Channel (FC) or Serial Attached SCSI (SAS) for block storage.

These storage systems typically provide one or two network ports and one or more external network switches are required to connect multiple hosts to such systems. External network switches are costly and take rack space in the space constraint data centers.

There are also substantial latencies and processing associated with the above mentioned protocols which makes the storage system slow to respond.

In a storage system employing physically-addressed SSD which maintains the flash block management tables on the system memory that has no power back-up means for the system and no power back-up means for the system memory, the flash block management tables that reside in the system memory are lost and if copies are maintained in the flash onboard the SSD, the copies may not be updated and/or may be corrupted if power failure occurs during the time a table is being saved (or updated) in the flash memory.

Hence, during a subsequent power up, during initialization, the tables have to be inspected for corruption due to power fail and, if necessary, recovered. The recovery requires reconstruction of the tables to be completed by reading metadata from flash pages and results in further increase in delay for system to complete initialization. The process of complete reconstruction of all tables is time consuming, as it requires metadata on all pages of SSD to be read and processed to reconstruct the tables. Metadata is non-user information written on a page. This flash block management table recovery, during power-up, further delays the system initialization, the time to initialize the system is a key metric in many applications.

Yet another similar problem of data corruption and power fail recovery arises in SSDs and also Hard Disc Drives (HDDs) when write data for write commands (or queued write commands when command queuing is supported) is cached in a volatile system memory and command completion issued prior to writing to media (flash or HDD). It is well known in the art that caching write data for write commands (or queued write commands when command queuing is supported) and issuing command completion prior to writing to media significantly improves performance.

Additionally, file systems and storage systems employ journaling or logging for error recovery, the journal or log associated with a command or commands is saved in a persistent storage. In the event of a power fail or system crash or failure, the journal or log is played back to restore the system to a known state.

As mentioned before, in some prior art techniques, a battery-backed volatile memory is utilized to maintain the contents of volatile memory for an extended period of time until power returns and tables can be saved in flash memory.

Battery backup solutions for saving system management data or cached user data during unplanned shutdowns are long-established but have certain disadvantage including up-front costs, replacement costs, service calls, disposal costs, system space limitations, reliability and "green" content requirements.

Additionally, storage systems suffer from becoming inoperable upon encountering a single point of failure. If a component within the storage system fails, the data in the storage system becomes unavailable to the servers until it is serviced.

What is needed is a storage system that reliably operates even in the face of a point of failure.

SUMMARY OF THE INVENTION

Briefly, a high-availability storage system includes a first storage system and a second storage system. The first storage system includes a first Central Processing Unit (CPU), a first physically-addressed solid state disk (SSD) that is addressable using physical addresses associated with user data, provided by a host, to be stored in or retrieved from the physically-addressed SSD in blocks. The first storage system further includes a first non-volatile memory module that is coupled to the CPU, the non-volatile memory module includes flash tables used to manage blocks in the physically addressed SSD. The flash tables include tables used to map logical to physical blocks for identifying the location of stored data in the physically addressed SSD. The second storage system includes a second CPU and a second SSD, wherein the flash tables are maintained in the non-volatile memory modules thereby avoiding reconstruction of the flash tables upon power interruption, and upon failure of one of the first or second CPUs, the storage system with the non-failing CPU continues to be operational and the storage system with the failed CPU is deemed in operational.

These and other objects and advantages of the invention will no doubt become apparent to those skilled in the art after having read the following detailed description of the various embodiments illustrated in the several figures of the drawing.

DETAILED DESCRIPTION OF VARIOUS EMBODIMENTS

In an embodiment of the invention, a storage system includes a Central Processing Unit (CPU) a system memory, a network interface controller for connection to a network and one or more physically addressed SSD (paSSD), coupled to the CPU through a system bus such as Peripheral Component Interconnect Express (PCIe) bus and addressable using physical addresses for storing data provided via the network. The data is to be stored in or retrieved from the physically-addressed SSD in blocks.

Further, a non-volatile memory module is coupled to the CPU and used for storing flash block management tables (also referred to herein as "flash tables"), caching data, and maintaining a journal. The flash tables have tables that are used to map logical to physical blocks for identifying the location of stored data in the physically addressed SSD. The flash tables are maintained in the non-volatile memory modules thereby avoiding reconstruction of the flash tables upon power interruption.

In one embodiment, all flash block management tables are in one or more non-volatile memory module comprised of MRAM coupled to processor though memory channels.

In an alternate embodiment, tables are maintained in system memory and are near periodically saved in flash onboard the physically-addressed SSD and the parts of the tables that are updated since last saved are additionally maintained in a non-volatile memory module comprised of MRAM that is coupled to the processor though memory channels, the current version of the block management table that is in flash along with the updates that are saved in MRAM being used to reconstruct the flash block management tables in system memory upon system power-up.

In yet another alternate embodiment, in order to reduce the size of updates in MRAM and frequency of flash table copy back to flash, one or more of the updates (along with revision numbers), are also copied to flash. The current version of the block management table that is saved in flash, along with past updates, that are saved in flash and recent updates that are saved in MRAM are used to reconstruct the flash block management tables in system memory upon system power-up.

In yet another embodiment, the contents of MRAM are coupled to the processor through a system bus such as Serial Peripheral Interface (SPI) bus or PCIe with analogous methods of the invention used to reconstruct the flash block management tables in system memory upon system power-up, such as by either using the current version of the block management table in flash along with recent updates that are saved in MRAM or using the current version of the block management table in flash along with the past updates that are saved in flash. The recent updates that are saved in the MRAM are used to reconstruct the flash block management tables in the system memory upon power-up.

In yet another embodiment, the physically-addressable SSD includes a flash subsystem and a non-volatile memory comprised of MRAM. In some embodiment of the invention, flash block management tables are maintained in the system memory and are nearly periodically saved in the flash subsystem onboard the paSSD and the parts of the tables that are updated since the last save are additionally maintained in the MRAM that is onboard the paSSD via methods that physically address the MRAM rather than the flash.

In all the above embodiments, cached data and/or journals can optionally be stored in the MRAM.

Figure 1:
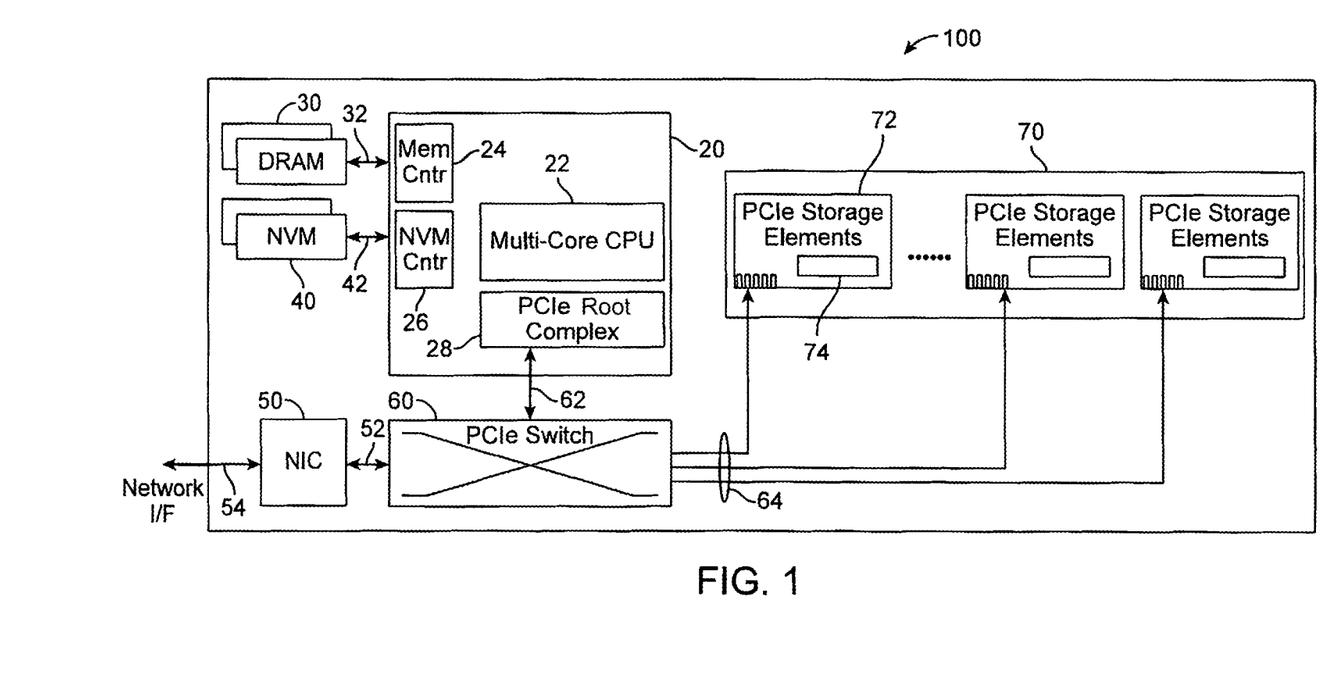
FIG. 1 shows a storage system 100, in accordance with an embodiment of the invention.

Referring now to FIG. 1, a storage system 100 is shown, in accordance with an embodiment of the invention. The system 100 is shown to include a Central Processor Unit (CPU) subsystem 20 (also known herein as "processor" or "host"), a system memory 30, a non-volatile memory (NVM) module 40, and a bank of physically-addressed solid state disks (SSD) 70, in accordance with an embodiment of the invention. A "Bank", as used herein, refers to one or more.

The CPU subsystem 20 of system 100 is shown to include a multi-core CPU 22, a memory controller 24. The memory controller is shown coupled through a memory bus 32 to the memory 30. The subsystem 20 is further shown to include a PCIe root complex 28, an NVM controller 26. The controller 26 is shown coupled to the NVM module 40 through a NVM bus 42. The memory 30 is shown coupled to the memory controllers 24 through memory bus 32.

The system 100 further includes a network interface controller (NIC) 50 and a peripheral component interconnect express bus (PCIe) switch 60. The NIC 50 is shown coupled through a PCIe bus 52 and network interface 54 for connection to the network. The PCIe switch 60 is shown coupled to the PCIe root complex 28 of the CPU subsystem 20 through a PCIe bus 62.

The NIC 50 is shown to receive input through the network interface 54.

The storage array 70 is shown to include a bank of storage array elements 72. Each storage array element 72 is shown to include a bank of flash memories 74 and connects to the PCIe switch 60 through the PCIe bus 64.

In other embodiment, bank of flash memories 74 may include other emerging Mass Storage Class (MSC) non-volatile memory technologies such as resistive RAM (RRAM) or Phase Change Memory (PCM) or any combination of in conjunction with flash memories.

The NIC 50 includes circuitry required to communicate with a specific physical layer and data link layer for receiving and transmitting information packets including command/status and data, as is known to those in the industry. The NIC 50 further includes circuitry required for communicating with upper layer protocols (layer above data link layer, such as transport layer, application layer, . . . ), as is also known in the industry.

NIC 50 is an exemplary Host Bus Adaptor (HBA) used in system 100. Other HBA such as Fiber Channel may be used to replace the NIC.

In some embodiments, the network interface 54 is a Gigabit or ten Gigabit Ethernet running Internet Small Computer System Interface (iSCSI) and in other embodiments, it is a Serial Attached SCSI (SAS) or Fiber Channel (FC), which are generally used with block storage protocols. In yet other embodiments, the network interface 52 is Gigabit or ten Gigabit Ethernet running network file storage (NFS) protocol. All of the foregoing interfaces are known in the art. In particular the Ethernet capabilities are either integrated into the CPU subsystem 20 or implemented via a low-cost dedicated NIC 50, connected directly to CPU subsystem 20 or through the PCIe switch 60 and PCIe bus 62 to CPU subsystem 20 as shown in FIG. 1.

In operation, a network switch is connected to the NIC 50 through the network interface 54. Multiple hosts can utilize the storage system 100 to perform read and write operations through the network switch. The NIC 50 receives commands from different hosts and directs them to the CPU subsystem 20. The CPU subsystem 20 processes commands received by the NIC 50 through the network interface 54 from the network switch and their associated payload; creates new commands and data structures required by storage array elements 72 of storage array 70 in the DRAM module 30 and the NVM module 40; and notifies the storage array elements 72 of storage array 70 accordingly. Each storage array element 72 independently communicates with the PCIe root complex 28 of the CPU subsystem 20 through the PCIe switch 60 via the PCIe busses 64 and 62 to retrieve their command and data structures. Once the storage array elements 72 have processed and completed their commands, they send completion status to the CPU subsystem 20. The CPU subsystem 20 collects the completion status from all the storage array elements 72 and formulates status corresponding to the host commands.

In some embodiment, the PCIe switch 60 may be integrated into the PCIe root complex 28 or the NIC 50 may be coupled directly to the CPU subsystem 20. In other embodiment, the PCIe switch 60 may include multiple and cascaded PCIe switches to provide the fan-out required by the storage system 100. By expanding the number of PCIe ports and PCIe lanes, the storage system can supports many physically-addressed SSD to provide the large storage capacities required for these class of systems. If the storage system lacks the number of PCIe ports and PCIe lane to support the required capacity, it will make such system disadvantageously smaller in capacity than desired.

High-availability storage appliances (also known as HA appliances or failover appliances) are storage systems designed with no single point of failure and can support server applications that can be reliably utilized with a minimum of down-time. They operate by harnessing redundant components that provide continued service when one of the system components fails (no single point of failure). Without the redundancy (single point of failure), if a component within the storage appliance fails, the data on the appliance will be unavailable to the servers until it is serviced.

In accordance with embodiments of the invention, HA storage appliance remedies the foregoing situation by detecting hardware/software faults, and immediately rerouting the traffic to the redundant components; a process known as failover. HA clusters are often used for critical databases, file sharing on a network, business applications, and customer services such as electronic commerce websites (HA appliance is used in applications where downtime is not acceptable).

HA storage appliance implementations attempt to build redundancy into the appliance to eliminate single points of failure, including multiple network connections and data storage, which is redundantly connected via storage area networks.

HA appliances usually use a heartbeat to monitor the health and status of each node in the appliance.

The most common size for an HA storage appliance is a two-node appliance, since that is the minimum required to provide redundancy, but many HA appliances consist of many more, sometimes dozens of nodes. Such configurations can sometimes be categorized into one of the following models:

Active/active—All nodes are active. In the event that one of the nodes fails, traffic intended for the failed node is either passed onto an existing node or load balanced across the remaining nodes.

Active/passive—Provides a fully redundant instance of each node, which is only brought online when its associated primary node fails. This configuration typically requires the most extra hardware.

N+1—Provides a single extra node that is brought online to take over the role of the node that has failed.

N+M—In cases where a single appliance is managing many servers, having only one dedicated failover node may not offer sufficient redundancy. In such cases, more than one (M) standby nodes are included and available. The number of standby servers is a tradeoff between cost and reliability requirements.

N-to-1—Allows the failover standby node to become the active one temporarily, until the original node can be restored or brought back online, at which point the services or instances must be failed-back to it in order to restore high availability.

N-to-N—A combination of active/active and N+M clusters, N to N appliances redistribute the traffic from the failed node among the remaining active nodes, thus eliminating (as with active/active) the need for a 'standby' node, but introducing a need for extra capacity on all active nodes.

HA appliances usually utilize all available techniques to make the individual systems and shared infrastructure as reliable as possible. These include:

Disk mirroring so that failure of internal disks does not result in system crashes.

Redundant network connections so that single cable, switch, or network interface failures do not result in network outages.

Redundant storage area network or SAN data connections so that single cable, switch, or interface failures do not lead to loss of connectivity to the storage (this would violate the share-nothing architecture).

Redundant electrical power inputs on different circuits, usually both or all protected by uninterruptible power supply units, and redundant power supply units, so that single power feed, cable, UPS, or power supply failures do not lead to loss of power to the system.

Referring still to FIG. 1, the NIC 50 is shown to receive input through the network interface 54.

For a further discussion of the operation of the system 100 and further details, the reader is directed to U.S. patent application Ser. No. 13/831,921, filed by Mar. 15, 2013, by Mehdi Asnaashari, and entitled "Storage System Employing Magnetic Random Access Memory (MRAM) and Array of Solid State Disks with Integrated Switch", the contents of which is incorporated herein by reference.

In some embodiments, in addition to using the NVM 40 as flash tables 202, the NVM 40 is used by the system 100 as non-volatile cache 206 for storing in-coming data (data that is input to the storage system 100) and or storing a journal 204.

The storage system 100 is shown to include one or more storage array elements 72, wherein the blocks are addressed with a physical rather than a logical address. The storage array elements 72 includes flash memories 74. As will be further discussed relative to FIGS. 1A, C, and D below, in the storage system 100 of FIG. 1, flash block management is performed by a software driver 200 (also known herein as the "driver") shown in FIG. 1C that is loaded during initialization of the system 100, after power-up. In addition to user commands, commands sent to the storage array elements 72 include commands for flash management (including garbage collection, wear leveling, saving flash tables) and these commands use physical address rather than logical address.

Figure 1A:
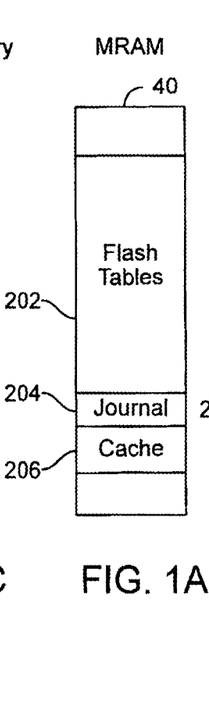
FIGS. 1A, C, and D show exemplary contents of the system memory 30, the NV module 40, and the NAND flash 74, respectively, in accordance with an embodiment of the invention.

In one embodiment, as shown in FIG. 1a, the flash table 202 is saved in the non-volatile memory module 40 that is made of the MRAMs 40 of the embodiment of FIG. 1.

FIGS. 1A, C, and D show exemplary contents of the system memory 30, the NV module 40, and the NAND flash 74, respectively, in accordance with an embodiment of the invention.

The system memory 30 in FIG. 1C, is shown to include a driver 200, the NV module 40, in FIG. 1A, is shown to include the flash tables 202, journal 204, cache 206, and the flash memories 74, in FIG. 1D, is shown to include the user data 208. The driver 200, shown saved in system memory 30, in FIG. 1C, performs flash block management. The flash tables 202 are tables generally used for management of the flash memory blocks within the storage array element 72 of FIG. 1 and the user data 208 is generally information received by the storage array element 72 from the CPU subsystem 20 to be saved. The flash tables 202 include tables used for managing flash memory blocks. The driver 200 generally manages the flash memory blocks. As shown in FIG. 1a, the flash table 202 is maintained in the storage array element 72.

In an alternate embodiment, the flash tables 202 are maintained in the system memory 30 and are substantially periodically saved in the flash memories 74 of the storage array element 72, and the parts of the tables 202 that are updated (modified) since the previous save are additionally saved in the MRAM 40.

Figure 1B:
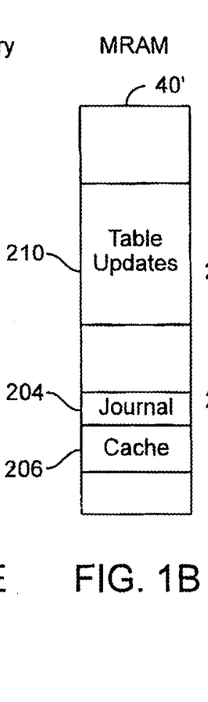
FIGS. 1B, E, and F show exemplary contents of the system memory 30', the NV module 40', and the NAND flash 74', respectively, in accordance with another embodiment of the invention.
Figure 1C:
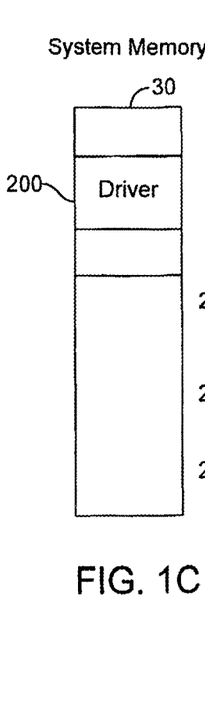
Figure 1D:
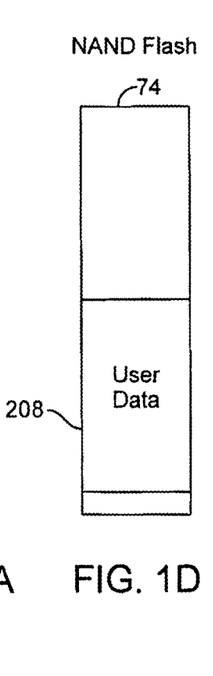
Figure 1E:
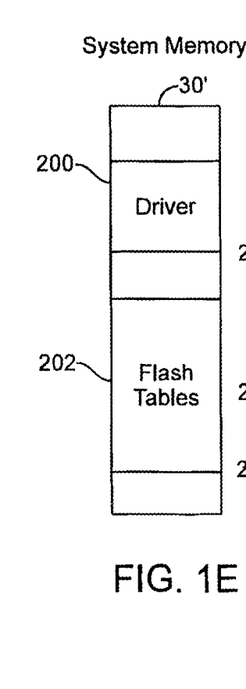
Figure 1F:
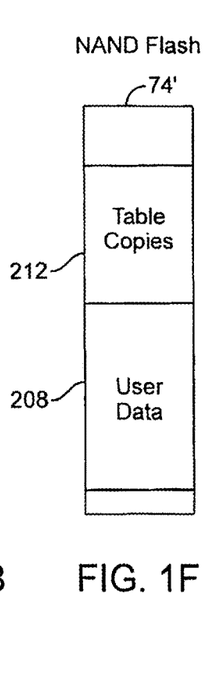

FIGS. 1B, E, and F show exemplary contents of the system memory 30', the NV module 40', and the NAND flash 74', respectively, in accordance with another embodiment of the invention.

In FIG. 1E, the system memory 30 is shown to include the driver 200 in addition to the flash tables 202. The MRAM 40' is shown to include the table updates 210, journal 204, cache 206 and the flash memories 74' is shown to include table copies 212 and the user data 208. As previously noted, the flash tables 202 are tables that are generally used for management of blocks within the storage array elements 72. The table updates 210 are generally updates to the flash tables 202 since the last copy of the flash tables 202 was initiated until a subsequent copy is initiated. The table copies 212 are snapshots of the flash tables 202 that are saved in the flash memories 72. This is further explained in U.S. patent application Ser. No. 13/673,866, filed on Nov. 9, 2012, by Siamack Nemazie, and entitled "System Employing MRAM and Physically Addressed Solid State Disk", the contents of which are incorporated herein by reference as though set forth in full. The user data 208 is information provided by the host (CPU subsystem 20 of FIG. 1).

In some embodiments, the NV module 40 and NV module 40' each includes spin torque transfer MRAM (STTM-RAM).

In some embodiments, each of the NV module 40 and NV module 40' is coupled to the CPU subsystem 20 via a system bus. An exemplary system bus is Serial Protocol Interconnect (SPI) or PCIe.

Accordingly, storage system 100 and the flash tables 202 are used to manage blocks in the storage array elements 72. The flash tables 202 include tables that are used to map logical blocks to physical blocks for identifying the location of stored data in the storage array elements 72 and the flash tables are maintained in the NV module 40 or NV module 40', which advantageously avoids reconstruction of the flash tables upon power interruption of the storage system 100.

Additionally, a cache or in particular a write back cache is maintained in the non-volatile memory module 40. The write cache contents are written to the storage array elements 72 upon triggers, such trigger including, among others, the cached data in the cache 206 to reach a certain limit. In one embodiment, the contents of the cache 206 are written to the storage array elements 72 in units of pages that are each aligned to a page boundary. In one embodiment, partial pages are maintained in the non-volatile memory module 40 and coalesced with other writes to write a full page to SSDs. In another embodiment, the partial page in the non-volatile memory module 40 is merged with the unmodified portion of the page in storage array elements 72, so that the page in the cache reflects the state of the page. For more details of the embodiments of FIGS. 1, 1a, and 1b, the reader is directed to U.S. patent application Ser. No. 13/769,710, filed on Feb. 19, 2013, by Siamack Nemazie, and entitled "Storage System Employing MRAM and Physically Addressed Solid State Disk".

Figure 2:
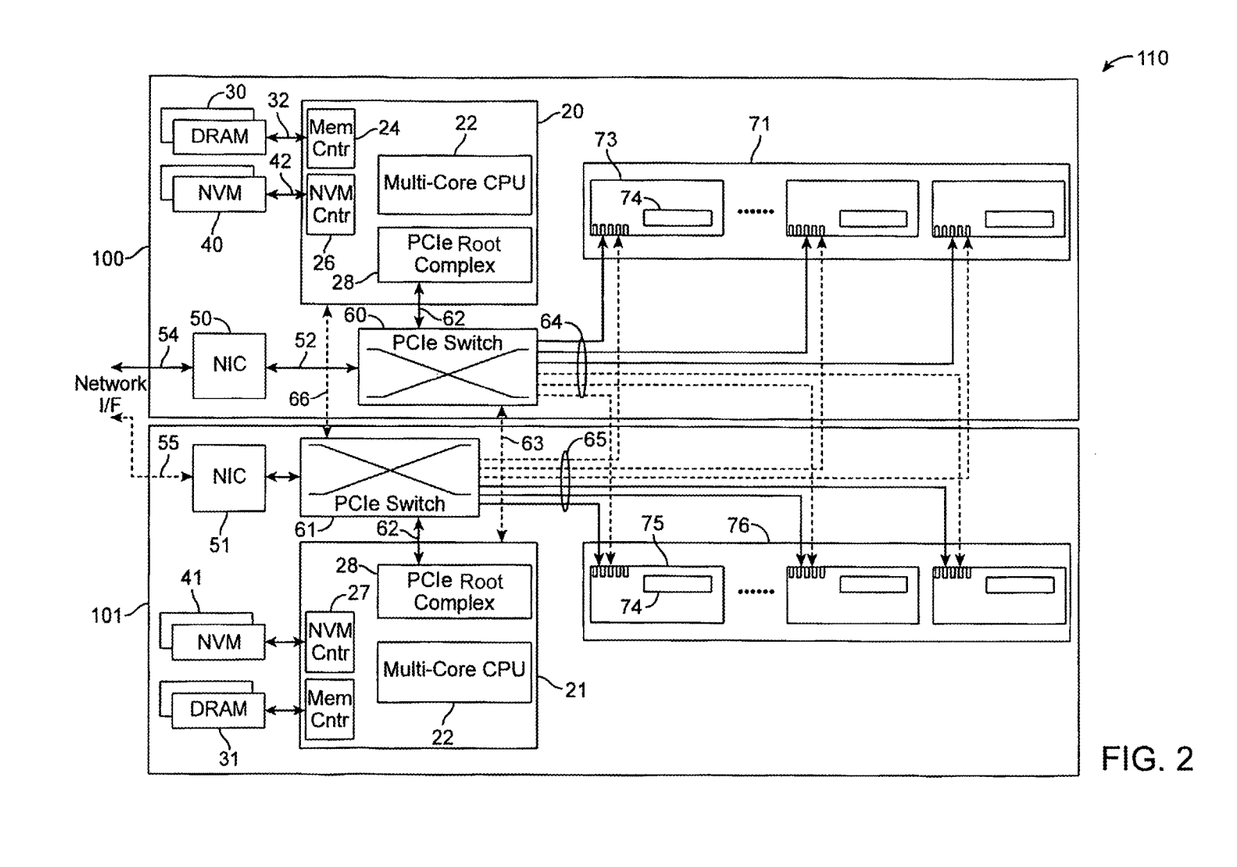
FIG. 2 shows a storage appliance 110, in accordance with another embodiment of the invention.

FIG. 2 shows a HA storage appliance (also referred to herein as "HA storage system") 110, in accordance with embodiment of the invention. In the embodiment of FIG. 2, the appliance 110 is shown to include the system 100 and a storage system 101 that is analogous to the system 100. The system 100 is shown coupled to the system 101 in that the PCIe switch 60 is coupled to not only the storage array 71 but also to the storage array 76 thus allowing the system 100 to communicate with the storage array 76. The PCIe switch 60 of the system 100 is, in addition to being coupled to the CPU sub-system 20, also coupled to the CPU subsystem 21 of the system 101. Similarly, the switch 61 of the system 101, in addition to being coupled to the CPU sub-system 21 and the storage array 76, is also coupled to the CPU sub-system 20 of the system 100 and the storage array 71 of the system 100.

Dashed lines in FIG. 2 indicate the redundant interconnections between the two system 100 and 101.

Referring still to FIG. 2, the storage appliance 110 is analogous to the storage system 100 of FIG. 1 with the following exception(s). An exception is that the storage system 100 is repeated twice in HA storage appliance 110 of FIG. 2 to provide the redundant components required for a HA storage system. Another exception is the interconnections between the storage array elements 73, 75 and the PCIe switches 60 and 61. Each storage array element 73 has two connections to two different PCIe switches 60 and 61. In the event that primary PCIe switch 60 ceases to operate, the storage array element 73 is accessed through the secondary PCIe switch 61. Similarly, CPU subsystems 20 and 21 have connections to both PCIe switches 60 and 61. Typically, PCIe switch 60 is the primary switch for CPU subsystem 20. In the event that the CPU subsystem 20 ceases to operate, the CPU subsystem 21 communicates with the storage array element 73 through the PCIe switch 61.

In another embodiment, similar fail over mechanism can be built into the appliance 110 for NIC modules 50 and 51. Each host is connected to HA storage appliance 110 through two network interfaces 54 and 55 to two different NIC 50 and 51. The two NIC 50 and 51 are both active and allow the host to communicate with both storage system 100 and 101 at the same time to utilize the storage array 71 and 76. In the event that one of the NIC cards; NIC 50 for example, ceases to operate, the host can continue to use the both storage arrays 71 and 76 through NIC 51 and the PCIe switch 61.

In the event that CPU subsystem 20 fails, the traffic through NIC 50 and PCIe switch 60 are routed to CPU subsystem 21 through PCIe bus 63. CPU subsystem 21 processes the commands and directs them to storage arrays 71 and 76.

In an embodiment of the invention, the CPU subsystems 20 and 21, NIC 50 and 51, and PCIe switches 61 and 62 are implemented on a separately serviceable modules to allow the system administrator of the HA storage appliance 110 to exchange the failed module without taking the HA storage appliance 110 out of service.

NVM modules 40 and 41 in storage system 100 and 101 respectively also have redundant connections to NVM controllers 26 and 27 in CPU subsystems 20 and 21. For example, in the event that the NVM controller 26 or the CPU subsystem 20, cease to operate, the NVM module 40 is accessible via NVM controller 27 and CPU subsystem 21.

In operation, by providing redundant processing elements, and dual-paths for connection to an element, the appliance 110 continues to operate despite failure of a single element. For example, upon failure of the switch 60 or the switch 61, the appliance 110 continues to operate by using the non-failing switch. In the high availability storage appliance 110, the contents of the NVM module 40 of the storage system 100 is duplicated in the NVM module 41 of the storage system 101 and the contents of the NVM module 41 of the storage system 101 is duplicated in the NVM module 40 of the storage system 100 to provide the redundancy of the contents required for high availability systems. When one of the NVM modules ceases to operate, the duplicated copy in the other module is used until the failed module is replaced and its content is reconstructed.

In some other embodiment of the high availability storage appliance 110, the storage array elements 73 and 75 have two independent PCIe ports, each connected to separate PCIe switch 60 and 61. In the event that one of the PCIe switches ceases to operate, the high availability storage system is reconfigured to access the storage array element through the redundant PCIe switch until the failed PCIe switch is replaced.

Yet in another embodiment of the high availability storage element, data is distributed and replicated across multiple storage array elements 73 and 75. A number of storage array elements 73 and 75 are divided into a RAID group with one or more storage array elements being the redundant array. In an event when one of the storage array elements ceases to operate, the high availability storage system is reconfigured to reconstruct the data of the failed element from rest of storage element of that RAID group until the storage array element is replaced and its content is reconstructed.

In an embodiment of the invention, the CPU subsystem 21 monitors the CPU subsystem 20 heartbeat and in some cases performs some of the tasks that a CPU subsystem is expected to carry out, along with the CPU subsystem 20. Heartbeat is a periodic signal to indicate normal operation of a system. In monitoring the CPU subsystem 20, if the CPU subsystem 21 detects failure by the CPU subsystem 20 due to absence of the heartbeat for predetermined extent of time, the CPU subsystem 21 reconfigures the storage system 100 and takes over the responsibility of the CPU subsystem 20 and renders CPU subsystem 20 inoperable. Similarly, in the same or another embodiment of the invention, the CPU subsystem 20 monitors the CPU subsystem 21 heartbeat and in some cases performs some of the tasks that a CPU subsystem is expected to carry out, along with the CPU subsystem 21. In monitoring the CPU subsystem 21, if the CPU subsystem 20 detects failure by the CPU subsystem 21, it reconfigures the storage system 100 and takes over the responsibility of the CPU subsystem 21 and the latter is rendered inoperable.

In an embodiment of the invention, one of the CPU subsystems 20 or 21 is actively processing the host commands and the other CPU is passive and only checking for the heartbeat and becomes active in an event that heartbeat is not sensed. In another embodiment, both CPU subsystems 20 and 21 are both active processing host commands and periodically checking each other's heartbeat.

In an embodiment of the invention, the NIC 50 or NIC 51 are monitored for operability and if one fails, the other takes over the failed NIC's responsibility. In some embodiment of the invention, in the case where an NIC does not fail, the NICs share responsibilities. This is true of the PCIe switches 60 and 61.

In one embodiment of the invention, in the event of an error such as lack of reception of commands from host or timeout due to lack of response from storage array elements, CPU subsystems 20 and 21 examine the PCIe switches 60 and 61 ports for proper operability and take appropriate action.

For example, in the event that CPU subsystem 20 can't communicate with one or more storage array elements of storage array 71, it will examine PCIE switch 60 ports connecting it to the storage array 70 through PCIe bus 64 in an attempt to identify the failed port(s). Upon detection of the failed port(s), it will reconfigure the storage appliance 100 to route the traffic intended for the storage array element(s) 73 connected to the failed port(s) through PICe bus 66 to PCIe switch 21 through PCIe bus 63 and back to storage array element(s) 73.

In another embodiment, in the event that CPU subsystem 20 doesn't receive commands from host for extended amount of time, it will examine PCIE switch 60 ports connecting it to the NIC 50 through PCIe bus 52 in an attempt to identify the failed port(s). Upon detection of the failed port(s), it will reconfigure the storage appliance 100 and informs host(s) of the broken link. Host(s) will use the redundant network interface 54 to communicate with the storage appliance 110. In one embodiment, CPU subsystem 20 configures the storage appliance 110 to route the host traffic intended for storage system 100 through NIC 51, PCIe switch 61, PCIe bus 66, back to CPU subsystem 20. In another embodiment, CPU subsystem 20 configures the storage appliance 110 to route the host traffic intended for storage system 100 through NIC 51, PCIe switch 61, PCIe bus 62, to CPU subsystem 21. CPU subsystem 21 will use the redundant PCIe bus 65 to communicate with storage array 71. CPU subsystem may alternatively use PCIe bus 63, PCIe switch 60 and PCIe bus 64 to communicate with storage array 71.

Figure 3:
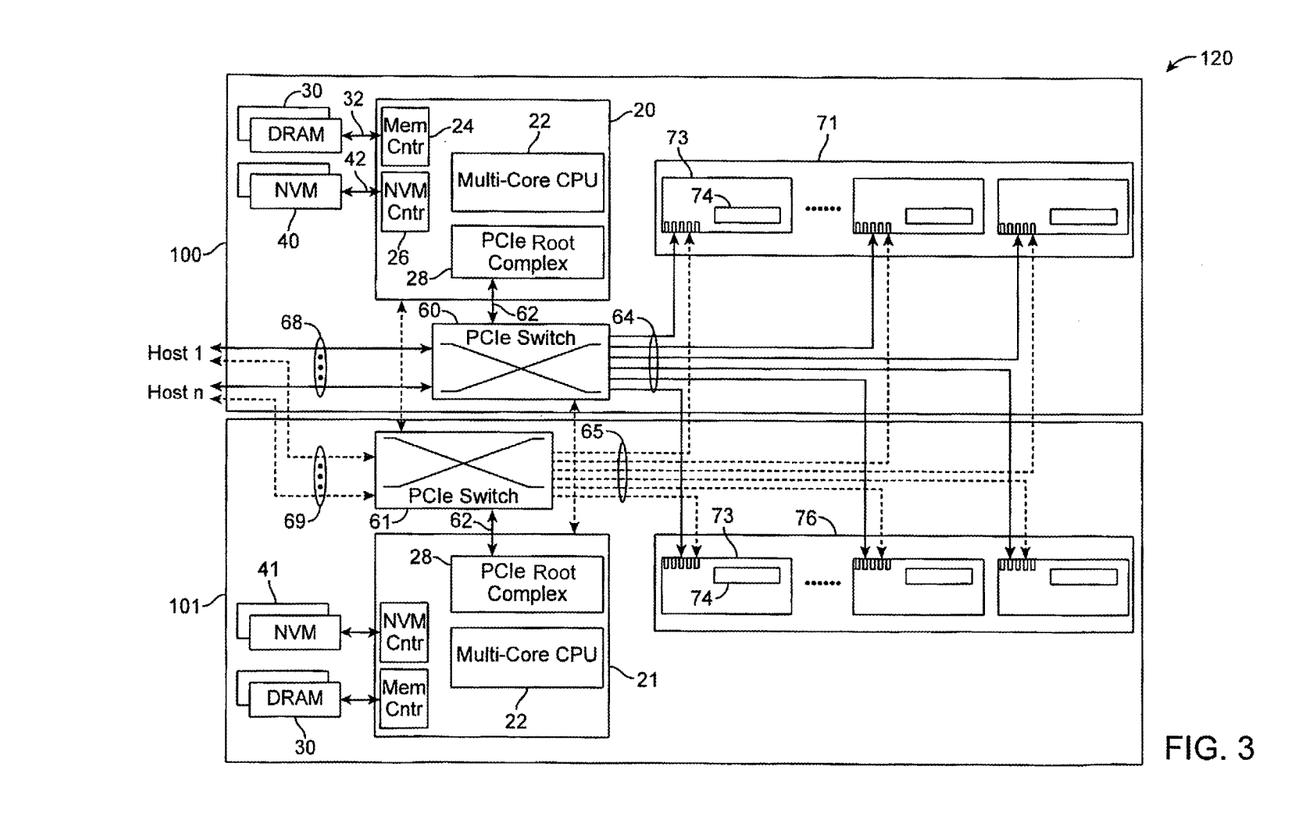
FIG. 3 shows a storage appliance 120, in accordance with yet another embodiment of the invention.

Referring now to FIG. 3, a HA storage appliance 120 is shown in accordance with an embodiment of the invention. HA storage appliance 120 is analogous to the HA storage appliance 110 of FIG. 2 except that the HA storage appliance 120 lacks the NIC 50 and 51 and network interfaces 54 and 55. In this embodiment, the host 1 through host 'n' are coupled to the PCIe switches 60 and 61 directly through the PCIe busses 68 and 69 with 'n' being an integer value. The embodiment of FIG. 3 allows host 1 through host n to be directly connected to the storage appliance 120 therefore eliminating the need for the external switches and NIC 50 and 51 of the embodiment of FIG. 2.

Figure 4:
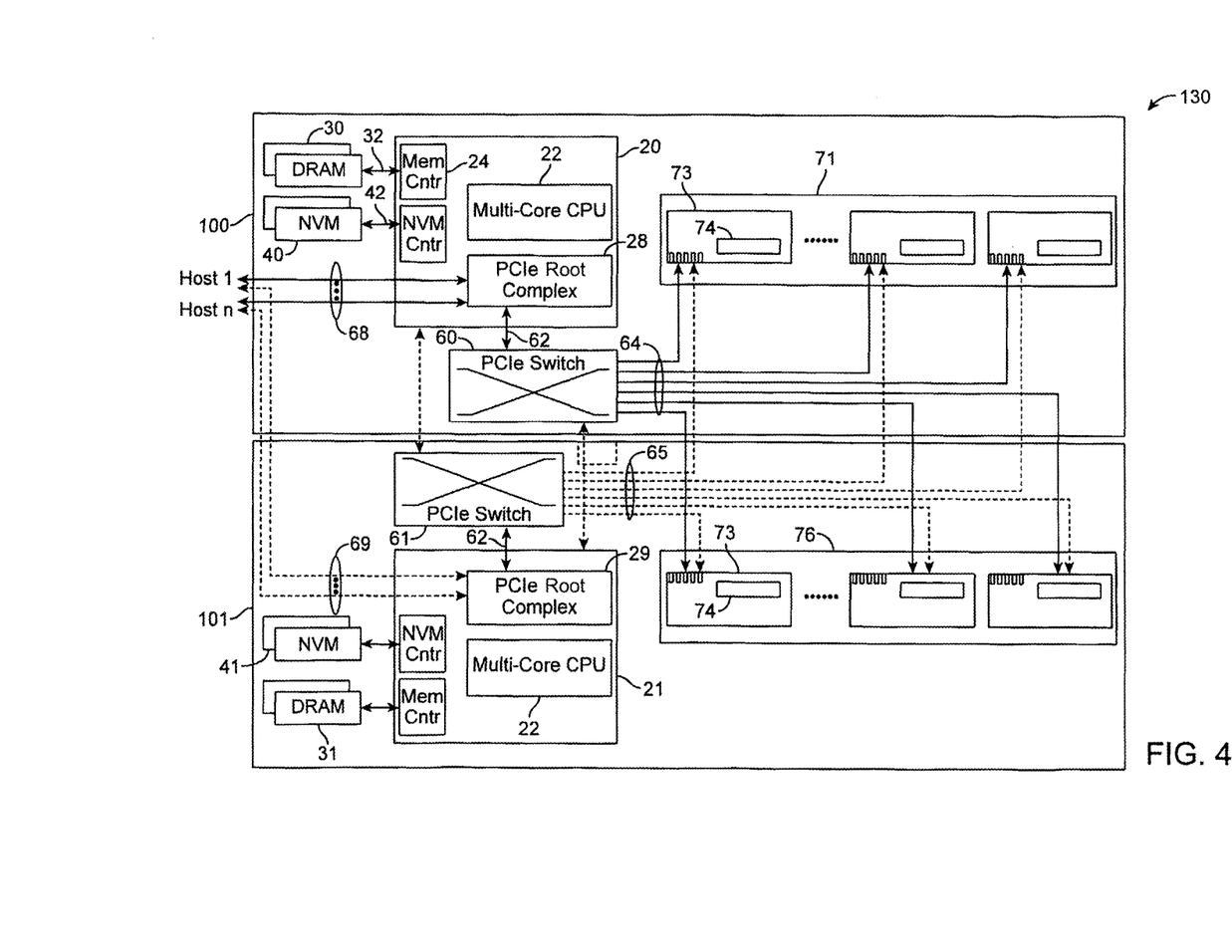
FIG. 4 shows a storage appliance130, in accordance with an embodiment of the invention.

FIG. 4 shows a HA storage appliance 130, in accordance with yet another embodiment of the invention. The HA storage appliance 130 is analogous to the HA storage appliance 120 with the exception of the host 1 through host n are shown coupled to the PCIe root complex 28 and 29 of the CPU subsystems 20 and 21 via the PCIe busses 68 and 69. In this embodiment, the PCIe switch is integrated into the PCIe root complex 28 and 29 of CPU subsystems 20 and 21.

Figure 5:
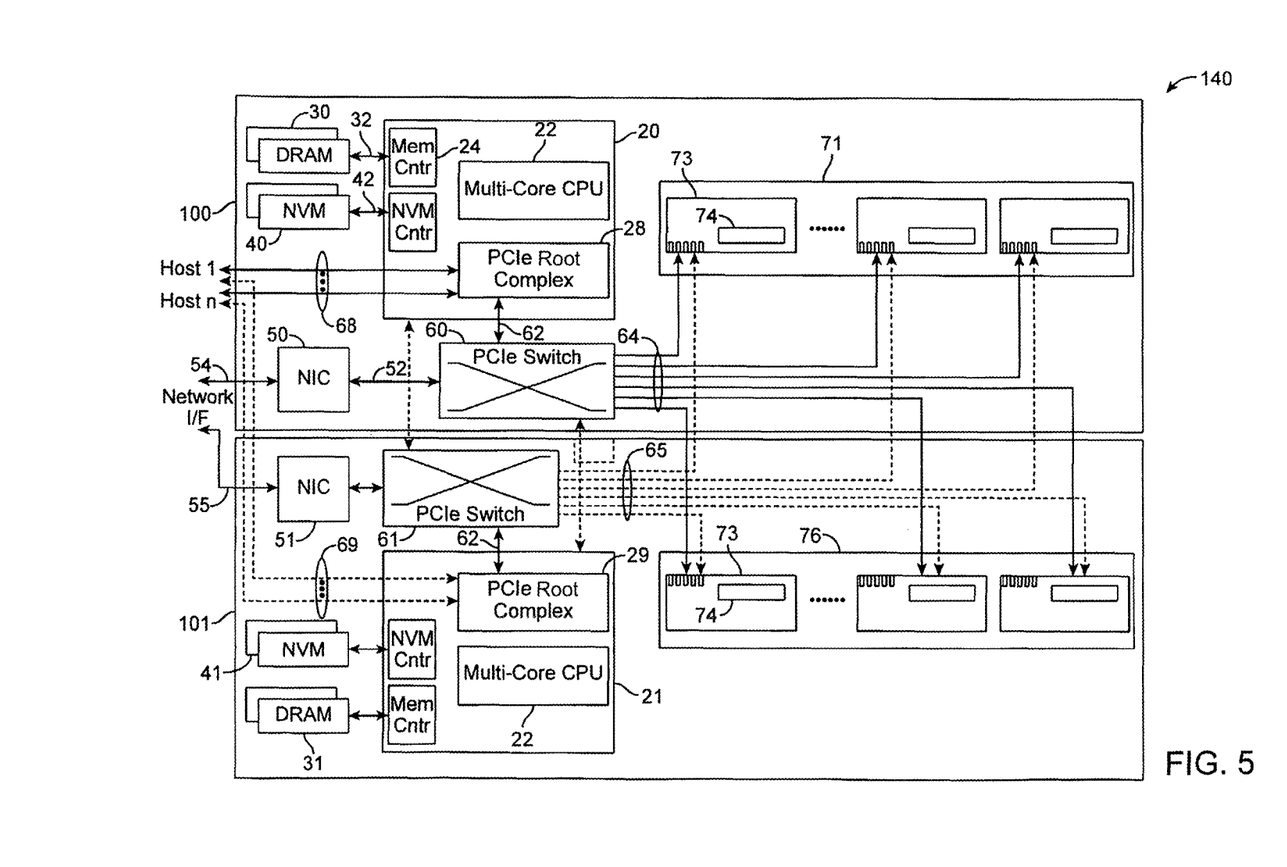
FIG. 5 shows a storage appliance 140, in accordance with another embodiment of the invention.

FIG. 5 shows a HA storage appliance 140, in accordance with another embodiment of the invention. The HA storage appliance 140 is analogous to the combination of HA storage appliances 110 of FIGS. 2 and 120 of FIG. 3. The HA storage appliance 140 provides both direct attached host connection through PCIe buses 68 and 69 as well as network interfaces 54 and 55. Local hosts can directly be attached to the HA storage appliance 140 and non-local hosts can be connected to the storage system through the network interface.

Figure 6:
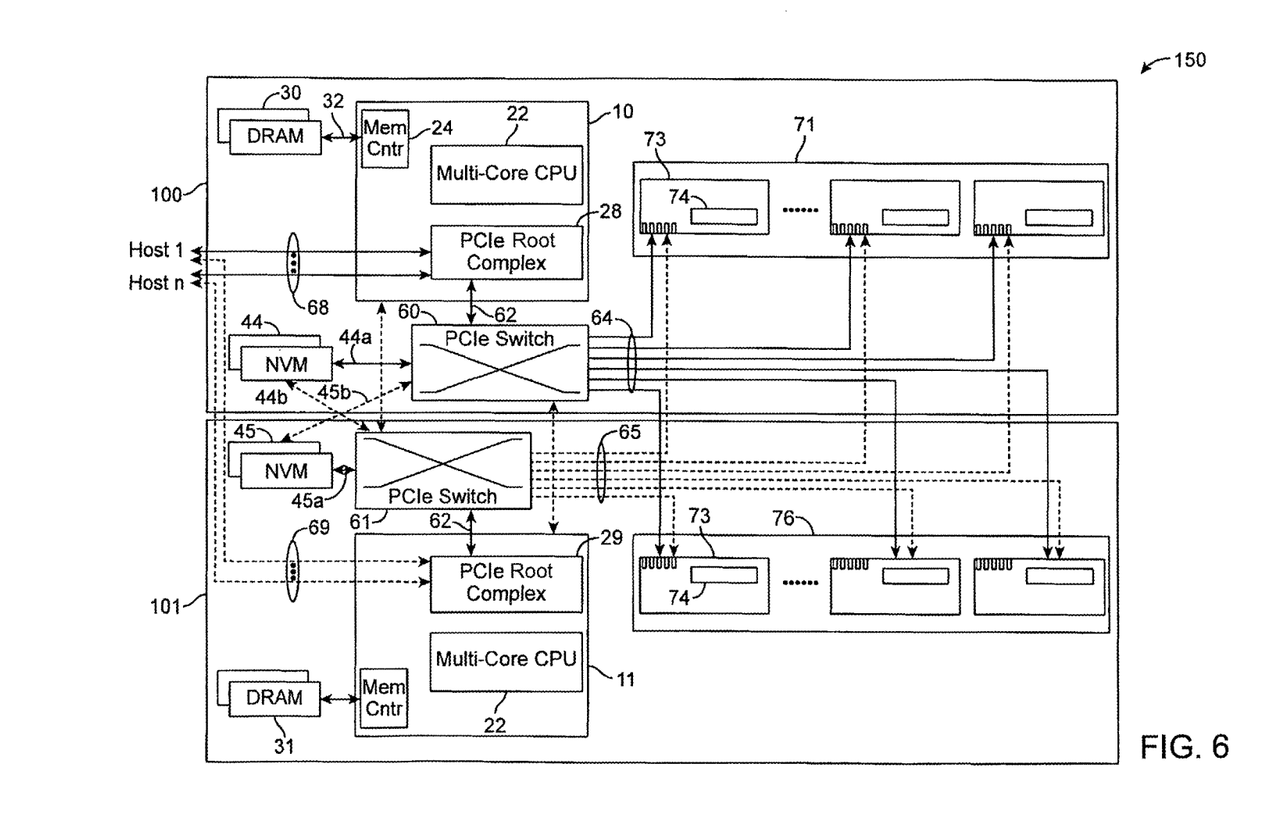
FIG. 6 shows a storage appliance 150, in accordance with another embodiment of the invention.

Referring now to FIG. 6, a HA storage appliance 150 is shown in accordance with another embodiment of the invention. The HA storage appliance 150 is analogous to the HA storage appliance 130 of FIG. 4 except that the NVM modules 44 and 45 are shown coupled to the PCIe switches 60 and 61. In HA storage appliance 130 of FIG. 4, NVM modules 40 and 41 are coupled to the NVM controller of CPU subsystems 20 and 21. Operationally, the HA storage appliances 150 and 110 behave analogously with the exception of the manner in which the NVM modules 44 and 45 are accessed by the CPU subsystems 20 and 21. That is, in the HA storage appliance 130, CPU subsystems 20 and 21 access the NVM module 40 and 41 through their respective NVM controller whereas in the HA storage appliance 150, the CPU subsystems 10 and 11 accesses the NVM modules 44 and 45 through the PCIe switches 60 and 61 and their respective PCIe root complex 28 and 29. In FIG. 6, the NVM module 44 is shown coupled to the PCIe switch 60 through PCIe bus 44a and further shown coupled to the PCIe switch 61 through the PCIe bus 44b. Similarly, the NVM module 45 is shown coupled to the PCIe switch 61 through PCIe bus 45a and further shown coupled to the PCIe switch 60 through the PCIe bus 45b.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A high-availability (HA) appliance system comprising:
 a first storage system including,
  a first Central Processing Unit (CPU);
  a first physically-addressed solid state disk (SSD) addressable using physical addresses; and
  a first Peripheral Component Interconnect Express (PCIe) switch coupled to the first CPU and the first physically-addressed SSD and responsive to information received from one or more hosts, at least some of the received information to be stored in the first physically-addressed SSD; and
 a second storage system including:
  a second CPU;
  a second physically-addressed SSD; and
  a second PCIe switch coupled to the second CPU and the second physically-addressed SSD,
 wherein the first PCIe switch is further coupled to the second CPU and the second PCIe switch is further coupled to the first CPU, upon failure of one of the first and second storage systems, the HA storage system remains operational and the first and second physically-addressed SSDs remain accessible to the one or more hosts.

2. The HA storage appliance of claim 1, wherein the physical addresses are used by the first and second CPUs to identify locations of stored information in the first and second physically-addressed SSDs.

3. The HA storage appliance of claim 1, wherein the second PCIe switch is further coupled to the first physically-addressed SSD.

4. The HA storage appliance of claim 1, wherein the first PCIe switch is further coupled to the second physically-addressed SSD.

5. The HA storage appliance of claim 1, wherein the first storage system includes a first network interface controller (NIC) coupled to the first CPU through the first PCIe switch.

6. The HA storage appliance of claim 5, wherein the first NIC couples the first CPU to the one or more hosts.

7. The HA storage appliance of claim 1, wherein the second storage system includes a second network interface controller (NIC), the second NIC being coupled to the second CPU through the second PCIe switch.

8. The HA storage appliance of claim 7, wherein the second NIC couples the second CPU to the one or more hosts.

9. The HA storage appliance of claim 1, wherein the first storage system includes a first network interface controller (NIC) coupled to the first CPU through the first PCIe switch and the second storage system includes a second network interface controller (NIC) coupled to the second CPU through the second PCIe switch.

10. The HA storage appliance of claim 1, further including a first non-volatile memory (NVM) module coupled to the first PCIe switch, the first NVM module including flash tables used to manage data blocks in the first and second physically-addressed SSDs.

11. The HA storage appliance of claim 10, wherein the flash tables are used to map logical blocks from the one or more hosts to physical blocks for identifying locations of stored data in the first and second physically-addressed SSDs.

12. The HA storage appliance of claim 10, further including a second non-volatile memory (NVM) module coupled to the second PCIe switch, the second NVM module including a duplicate copy of the flash tables.

13. The HA storage appliance of claim 10, wherein the first CPU is operable to create data structure required for accessing the first physically-addressed SSD in the first NVM module.

14. The HA storage appliance of claim 1, further including a first DRAM coupled to the first CPU, wherein data structure required for accessing the first physically-addressed SSD is created by the first CPU in the first DRAM.

15. The HA storage appliance of claim 14, further including a second DRAM coupled to the second CPU.

16. The HA storage appliance of claim 1, wherein the first PCIe switch couples the first CPU to a first host and the second PCIe switch couples the second CPU to a second host.

17. The HA storage appliance of claim 16, wherein the first PCIe switch is further coupled to the second host and the second PCIe switch is further coupled to the first host.

* * * * *